(12) United States Patent  
Wu

(10) Patent No.: US 7,837,584 B2  
(45) Date of Patent: Nov. 23, 2010

(54) CHAIN

(75) Inventor: Daniel Wu, Tainan (TW)

(73) Assignee: KMC Chain Industrial Co., Ltd., Yongkang, Tainan County (TW)

( * ) Notice: Subject to any disclaimer, the term of this patent is extended or adjusted under 35 U.S.C. 154(b) by 64 days.

(21) Appl. No.: 12/022,717

(22) Filed: Jan. 30, 2008

(65) Prior Publication Data

US 2008/0182691 A1 Jul. 31, 2008

(30) Foreign Application Priority Data

Jan. 31, 2007 (TW) .............................. 96103495 A

(51) Int. Cl.
*F16G 13/02* (2006.01)
(52) U.S. Cl. ..................... 474/218; 474/224; 474/227
(58) Field of Classification Search ................ 474/206, 474/218–220, 224–227
See application file for complete search history.

(56) References Cited

U.S. PATENT DOCUMENTS

| 818,469 A | 4/1906 | Rogers | |
| 2,546,368 A * | 3/1951 | McIntosh et al. | ............ 474/227 |
| 2,568,650 A | 9/1951 | Mcintosh et al. | |
| 5,066,265 A | 11/1991 | Wu | |
| 5,291,730 A * | 3/1994 | Wu | ............................. 59/85 |
| 5,299,416 A * | 4/1994 | Wu | ............................. 59/85 |
| 5,741,196 A * | 4/1998 | Campagnolo | ............... 474/226 |

FOREIGN PATENT DOCUMENTS

| FR | 34 581 | 9/1929 |
| FR | 2 394 720 | 1/1979 |
| TW | 171756 | 10/1991 |

* cited by examiner

*Primary Examiner*—Robert A Siconolfi
*Assistant Examiner*—Anna Momper
(74) *Attorney, Agent, or Firm*—Merchant & Gould P.C.

(57) ABSTRACT

A chain includes a connecting unit including two chain plates, and a link unit having first and second link plates parallel to the chain plates and a link pin. The first link plate is formed with a stop block and a retaining hole having an insert hole portion and a retaining hole portion. The link pin has an engaging end portion extending through the chain plates and the retaining hole portion. The connecting unit is pivotable about the link pin between a first position, where the link pin is allowed to move entirely from the retaining hole portion into the insert hole portion to thereby allow removal of the link pin from the first link plate, and a second position, where the link pin is not allowed to move entirely from the retaining hole portion into the insert hole portion due to contact of an edge of one of the chain plates with the stop block.

11 Claims, 16 Drawing Sheets

CHAIN

CROSS-REFERENCE TO RELATED APPLICATION

This application claims priority of Taiwanese Application No. 096103495, filed on Jan. 31, 2007.

BACKGROUND OF THE INVENTION

1. Field of the Invention

The invention relates to a chain, more particularly to a chain having a link unit for connecting two ends of a chain body.

2. Description of the Related Art

Taiwanese Patent Publication No. 171756 discloses a conventional chain. Referring to FIGS. 1 and 2, the conventional chain 1 comprises a chain body 11 and a link unit 10 for connecting two ends of the chain body 11. The chain body 11 includes a pair of connecting units 111 and a plurality of outer and inner chain plates 113, 114 connected to the connecting units 111. Each of the connecting units 111 has a pair of connecting chain plates 112 spaced apart from each other in a first direction (L). The link unit 10 includes a pair of link plates 12 spaced apart from each other in the first direction (L), and a pair of link pins 13. Each of the link plates 12 extends in a second direction (L1) transverse to the first direction (L), and has a pair of end plate parts 121 and a connecting plate part 122 interconnecting the end plate parts 121. One of the end plate parts 121 is formed with a mounting hole 123, and the other one of the end plate parts 121 is formed with a gourd-shaped retaining hole 124. The connecting plate part 122 has a pair of connecting surfaces 120 that extends in the second direction (L1). The retaining hole 124 has an insert hole portion 125 proximate to the connecting plate part 122, a retaining hole portion 126 distal from the connecting plate part 122, and a neck hole portion 127 disposed between the insert hole portion 125 and retaining hole portion 126. The insert hole portion 125 has a diameter larger than that of the retaining hole portion 126. Each of the link pins 13 has a mounting end portion 131 disposed in the mounting hole 123 in one of the link plates 12, and an engaging end portion 132 engaging the retaining hole portion 126 of the retaining hole 124 in the other one of the link plates 12. During assembling, each of the link pins 13 is inserted into the insert hole portion 125 of the corresponding retaining hole 124, and is then moved into the retaining hole portion 126 of the corresponding retaining hole 124.

However, when the conventional chain 1 is in use, the connecting units 111 may be pushed to move toward each other. If this occurs, the engaging end portion 132 of each of the link pins 13 may move from the corresponding retaining hole portion 126 into the corresponding insert hole portion 125, thereby resulting in separation of the link plates 12 from the connecting units 111. Moreover, the connecting surfaces 120 of the connecting plate part 122 of each of the link plates 12 have to be configured to be parallel to each other so as to meet the structural strength requirement of the link plates 12. Therefore, the outlines of the link plates 12 are different from those of the outer chain plates 113. If the conventional chain 1 is adapted for use in a multi-speed bicycle, the outline difference between the link plates 12 and the outer chain plates 113 will obstruct the smooth speed-changing operation of the conventional chain 1.

SUMMARY OF THE INVENTION

Therefore, the object of the present invention is to provide a chain that has a link unit capable of connecting securely two ends of a chain body, and that can facilitate smooth speed-changing operation when applied to a multi-speed bicycle.

Accordingly, a chain of the present invention comprises a chain body and a link unit. The chain body includes a connecting unit disposed at an end thereof. The connecting unit has a pair of first and second chain plates extending in a longitudinal direction and spaced apart from each other in a first transverse direction transverse to the longitudinal direction. Each of the first and second chain plates has an end plate portion that is formed with a through hole therethrough. The through hole in one of the first and second chain plates is registered with that in the other one of the first and second chain plates in the first transverse direction. The end plate portion of the first chain plate is further formed with a large diameter edge section that has a first distal edge, and at least one small diameter edge section that has a second distal edge. The through hole in the first chain plate has a central point. The distance between the first distal edge and the central point of the through hole in the first chain plate is longer than that between the second distal edge and the central point of the through hole in the first chain plate. The link unit includes first and second link plates and a link pin. The link plates are disposed parallel to the first and second chain plates and are spaced apart from each is other in the first transverse direction. Each of the first and second link plates has a pair of opposite end plate parts and a waist plate part that interconnects the end plate parts. The first link plate is formed with a retaining hole at one of the end plate parts that has an insert hole portion proximate to the waist plate part and a retaining hole portion distal from the waist plate part and having a diameter shorter than that of the insert hole portion, and a stop block at the waist plate part that projects toward the second link plate. The link pin is connected between the first and second link plates, extends in the first transverse direction, and has an engaging end portion extending through and engaging fittingly the through holes in the first and second chain plates and the retaining hole portion of the retaining hole in the first link plate so as to allow synchronous movement of the link pin and the first and second chain plates. The connecting unit is pivotable about the link pin between a first position, where the stop block is registered with the second distal edge so as to allow the link pin to move entirely from the retaining hole portion into the insert hole portion to thereby allow removal of the link pin from the first link plate, and a second position, where the stop block is registered with the first distal edge so as to prevent the link pin from moving entirely from the retaining hole portion into the insert hole portion due to contact of the first distal edge with the stop block.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
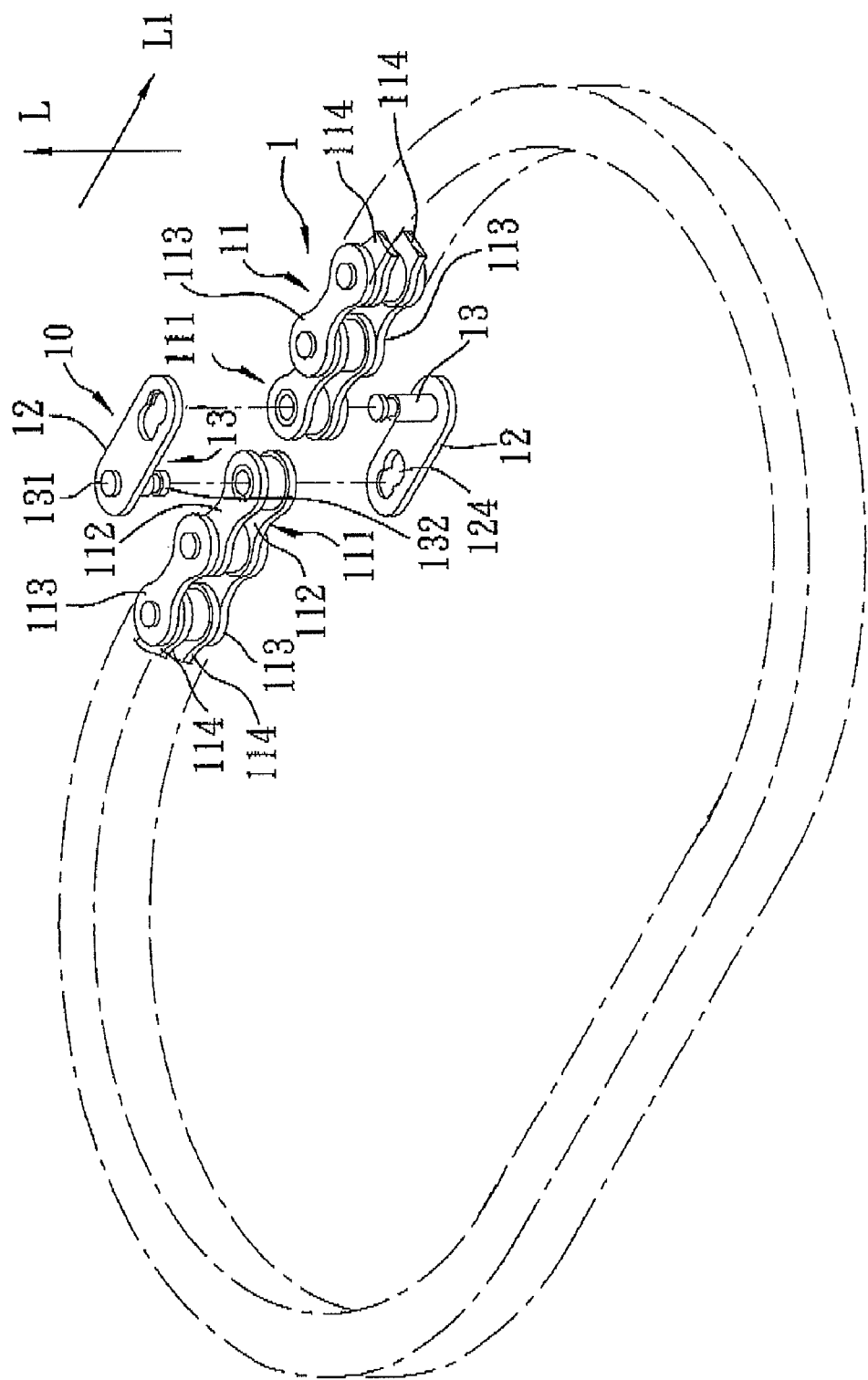
FIG. 1 is a fragmentary, partly exploded perspective view of a conventional chain.
Figure 2:
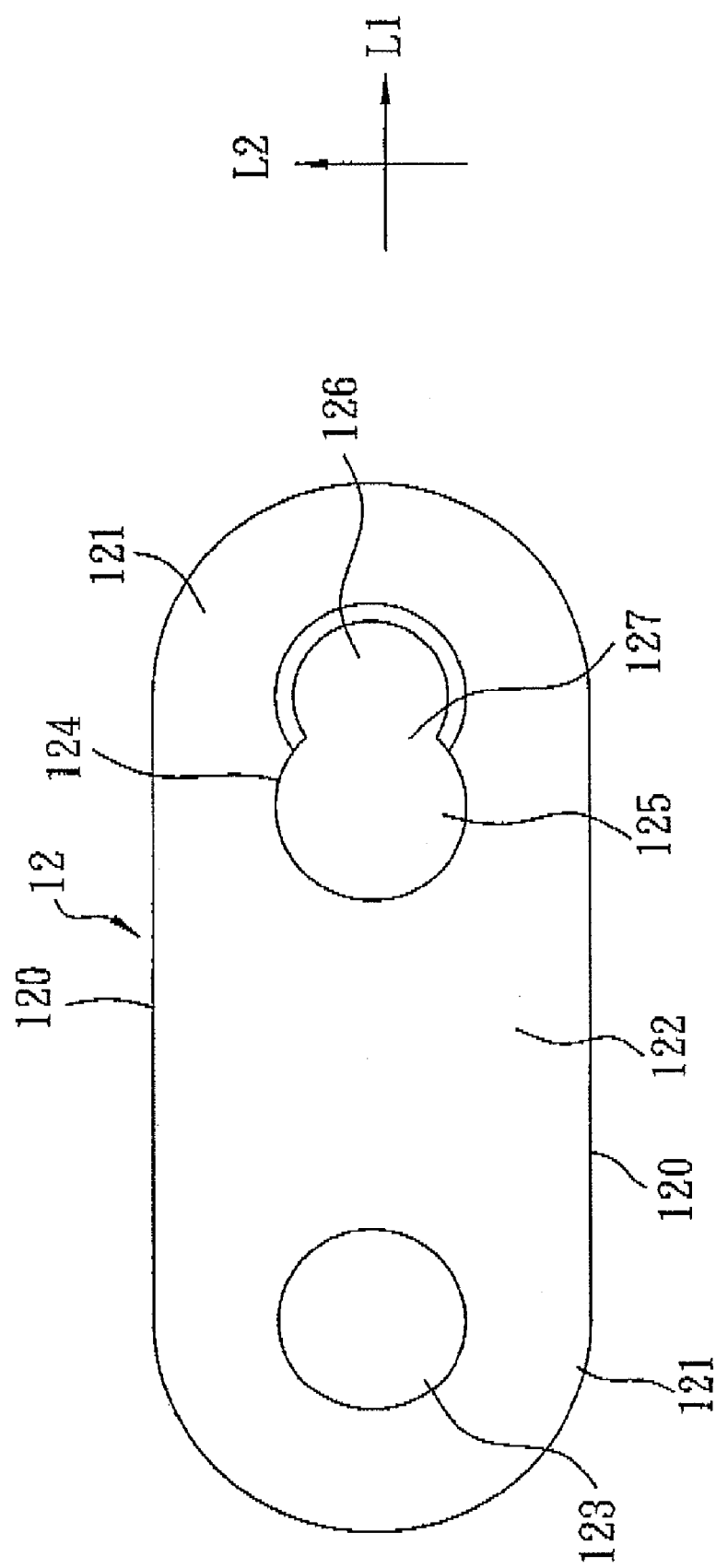
FIG. 2 is a side view of a link plate of the conventional chain.

Before the present invention is described in greater detail, it should be noted that like elements are denoted by the same reference numerals throughout the disclosure.

Figure 3:
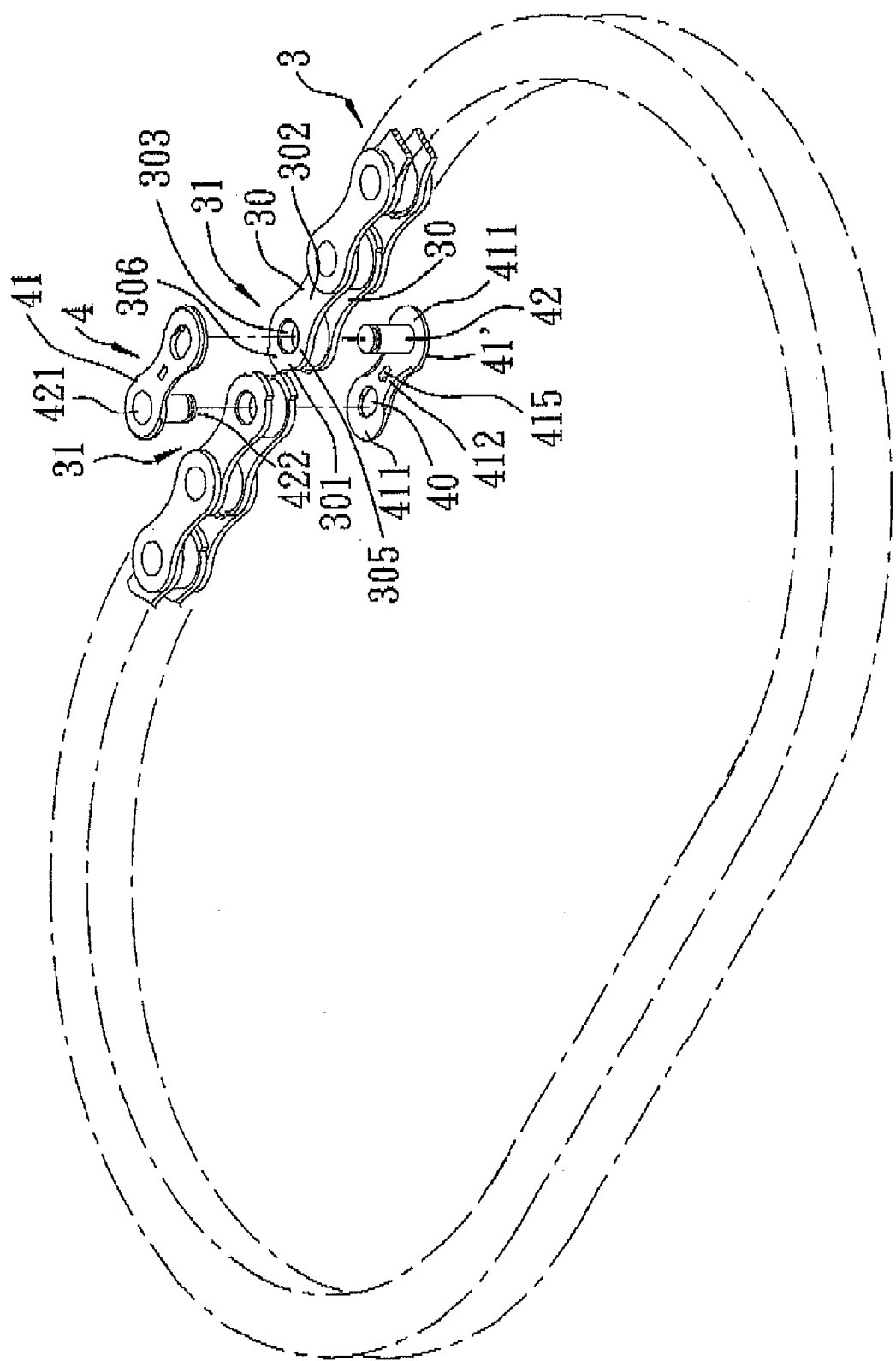
FIG. 3 is a fragmentary, partly exploded perspective view of a first preferred embodiment of a chain according to the invention.
Figure 4:
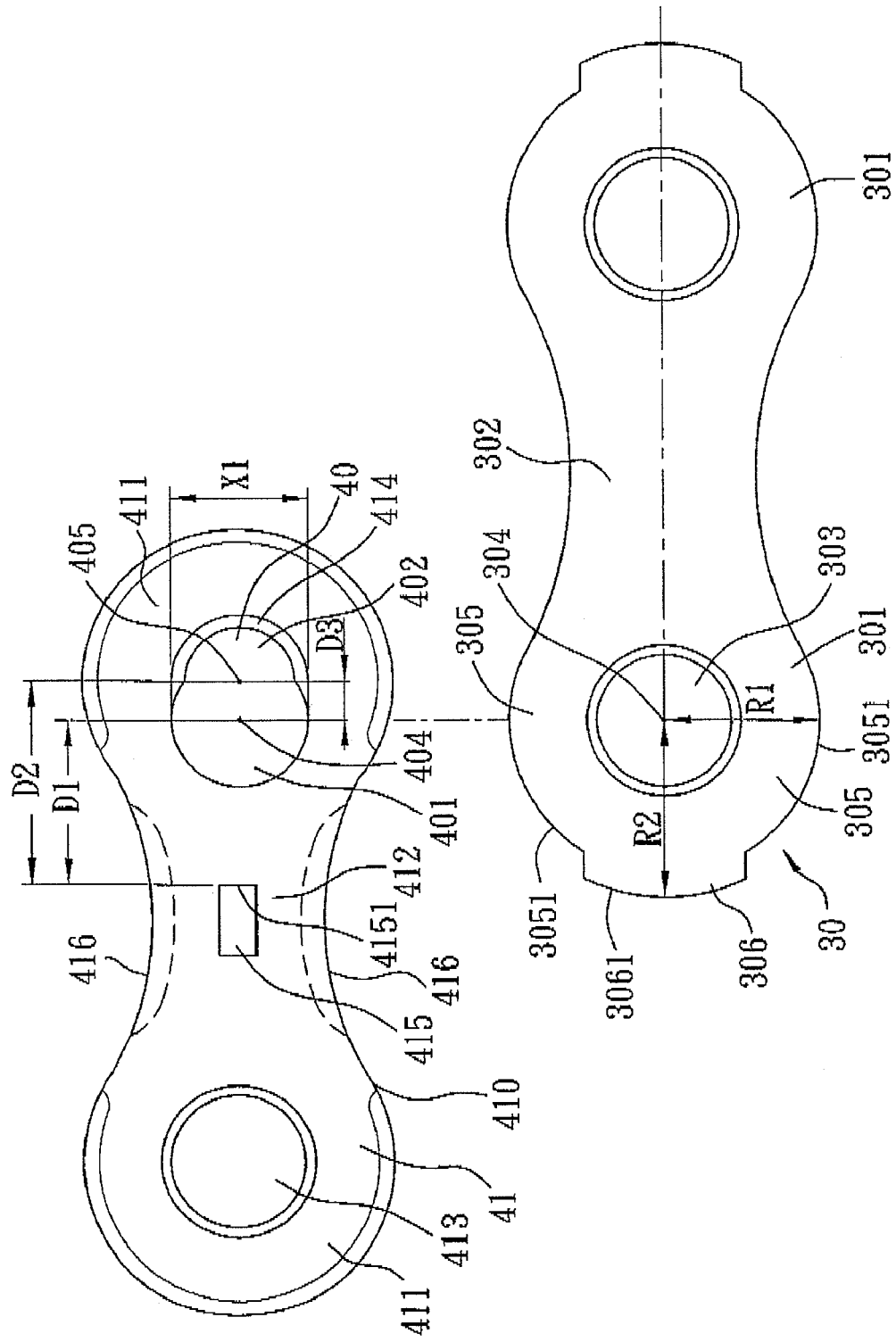
FIG. 4 is a side view of a first chain plate and a first link plate of the first preferred embodiment.
Figure 5:
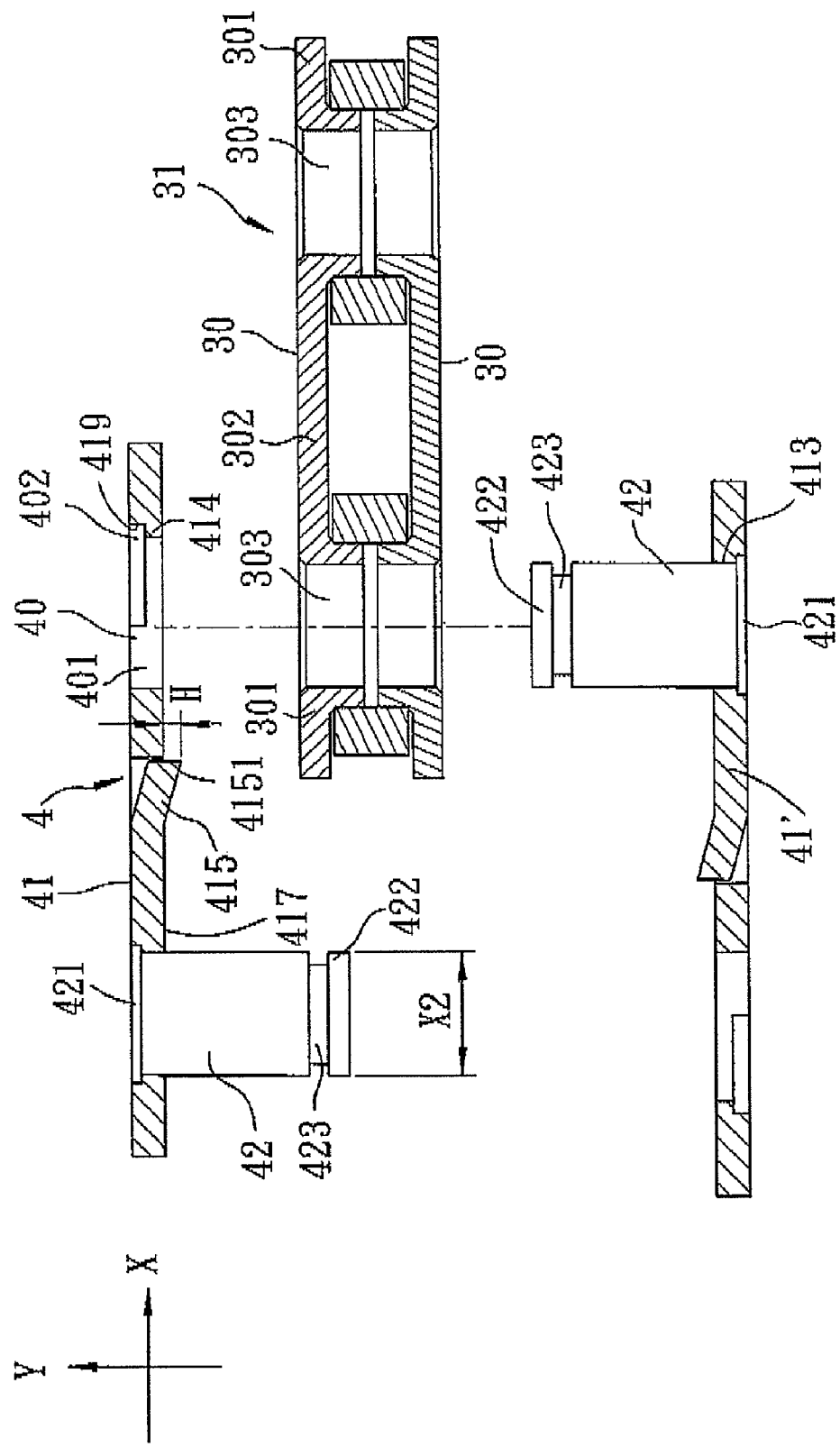
FIG. 5 is a fragmentary exploded sectional view of the first preferred embodiment, illustrating a connecting unit and a link unit.

As shown in FIGS. 3 to 5, the first preferred embodiment of a chain according to the present invention comprises a chain body 3 and a link unit 4.

The chain body 3 includes a pair of connecting unit 31 disposed respectively at two ends thereof. Each of the connecting units 31 has a pair of first and second chain plates 30 extending in a longitudinal direction (X) and spaced apart from each other in a first transverse direction (Y) transverse to the longitudinal direction (X). Each of the first and second chain plates 30 has a pair of end plate portions 301 that are spaced apart from each other in the longitudinal direction (X), and a waist plate portion 302 that interconnects the end plate portions 301. The waist plate portion 302 has a width in a second transverse direction (Z) perpendicular to the longitudinal direction (X) and the first transverse direction (Y) that is smaller than those of the end plate portions 301. In this embodiment, each of the end plate portions 301 is formed with a through hole 303 therethrough, a large diameter edge section 306 that projects therefrom in the longitudinal direction (X) and that has a first distal edge 3061, and a pair of small diameter edge sections 305 that flank the through hole 303 and that are spaced apart from each other along the second transverse direction (Z). Each of the small diameter edge sections 305 has a second distal edge 3051. Each of the first and second distal edges 3061, 3051 extends in a circumferential direction of the through hole 303 in a corresponding one of the first and second chain plates 30. Since the structures of the connecting units 31 are identical, only one connecting unit 31 is mentioned in the following description. Moreover, since each of the first and second chain plates 30 is in a symmetrical configuration in the longitudinal direction (X) and the second transverse direction (Z), each of the first and second chain plates 30 will be described to have one end plate portion 301 formed with one through hole 303 in the following description.

The through hole 303 in the end plate portion 301 of one of the first and second chain plates 30 of the connecting unit 31 is registered with that in the other one of the first and second chain plates 30 in the first transverse direction (Y). The through hole 303 in each of the first and second chain plates 30 has a central point 304. For each of the first and second chain plates 30, a first radial distance (R1) between the central point 304 of the through hole 303 and the second distal edges 3051 is longer than a second radial distance (R2) between the first distal edge 3061 and the central point 304.

The link unit 4 includes a pair of first and second link plates 41, 41' spaced apart from each other in the first transverse direction (Y) and a pair of link pins 42 disposed between the first and second link plates 41, 41'. The first and second link plates 41, 41' are disposed parallel to the first and second chain plates 30 of the connecting unit 31 and are respectively adjacent to the first and second chain plates 30. Each of the first and second link plates 41, 41' has a gourd-shaped outline that corresponds to the chain plates 30, a pair of opposite end plate parts 411 and a waist plate part 412 that interconnects the end plate parts 411. Each of the first and second link plates 41, 41' further has a pin mounting hole 413 formed at one of the end plate parts 411 and a retaining hole 40 formed at the other one of the end plate parts 411. The waist plate part 412 of each of the first and second link plates 41, 41' is formed with a stop block 415 projecting toward the other one of the first and second link plates 41, 41' and having a stop surface 4151 that faces the corresponding retaining hole 40. Each of the first and second link plates 41, 41' further has a flat side surface 417 (see FIG. 5) facing an adjacent one of the first and second chain plates 30 and formed with the stop block 415, and two concaved surfaces 416 formed respectively at two opposite sides of the corresponding waist plate part 412 in the second transverse direction (Z). The pin mounting hole 413 in one of the first and second link plates 41, 41' is registered with the retaining hole 40 in the other one of the first and second link plates 41, 41' in the first transverse direction (Y).

For each of the first and second link plates 41, 41' of the link unit 4, the retaining hole 40 has an insert hole portion 401 proximate to the waist plate part 412, and a retaining hole portion 402 distal from the waist plate part 412 and having a diameter shorter than that of the insert hole portion 401. Each of the insert hole portion 401 and the retaining hole portion 402 has a central point 404, 405. Each of the first and second link plates 41, 41' further has an inner surrounding wall 419 (see FIG. 5) that defines the retaining hole portion 402 and a flange 414 that extends radially and inwardly from the inner surrounding wall 419 toward the central point 405 of the retaining hole portion 402. Each of the flanges 414 has two ends that are spaced apart from each other in the second transverse direction (Z) by a fifth distance (X1), and a thickness in the first transverse direction (Y) that is shorter than that of a corresponding one of the first and second link plates 41, 41'. In this embodiment, as best shown in FIG. 4, for each of the first and second link plates 41, 41' the second radial distance (R2) is longer than a first distance (D1) between the stop surface 4151 and the central point 404 of the insert hole portion 401, and is shorter than a second distance (D2) between the stop surface 4151 and the central point 405 of the retaining hole portion 402. The first distance (D1) is longer than the first radial distance (R1).

Each of the link pins 42 extends in the first transverse direction (Y) through the corresponding first and second link plates 41, 41', and has a mounting end portion 421, and an engaging end portion 422 opposite to the mounting end portion 421 in the first transverse direction (Y), formed with a retaining annular groove 423, and having a first diameter (X2) (See FIG. 5). The fifth distance (X1) is no shorter than the first diameter (X2).

Figure 6:
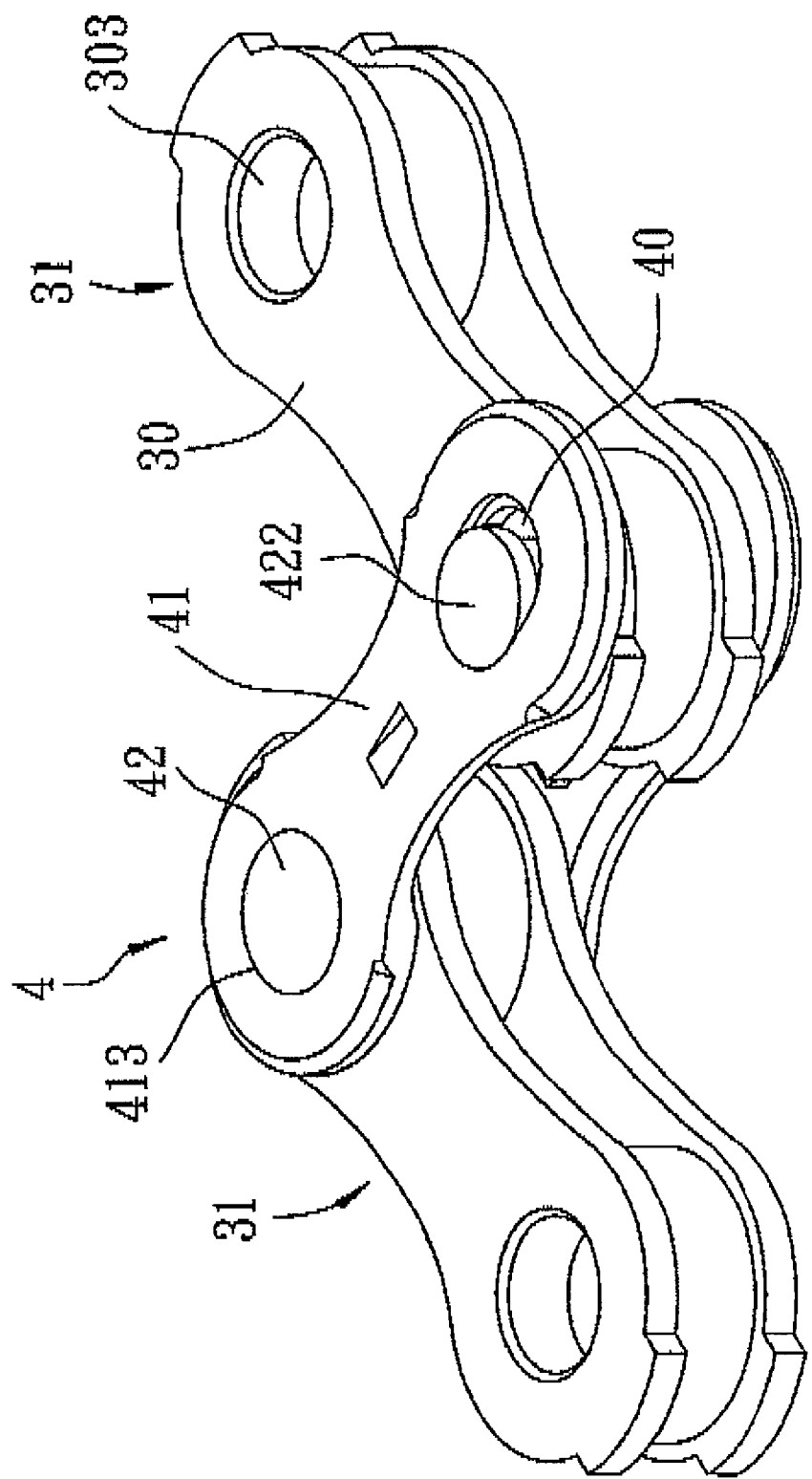
FIG. 6 is a fragmentary perspective view of the first preferred embodiment.
Figure 7:
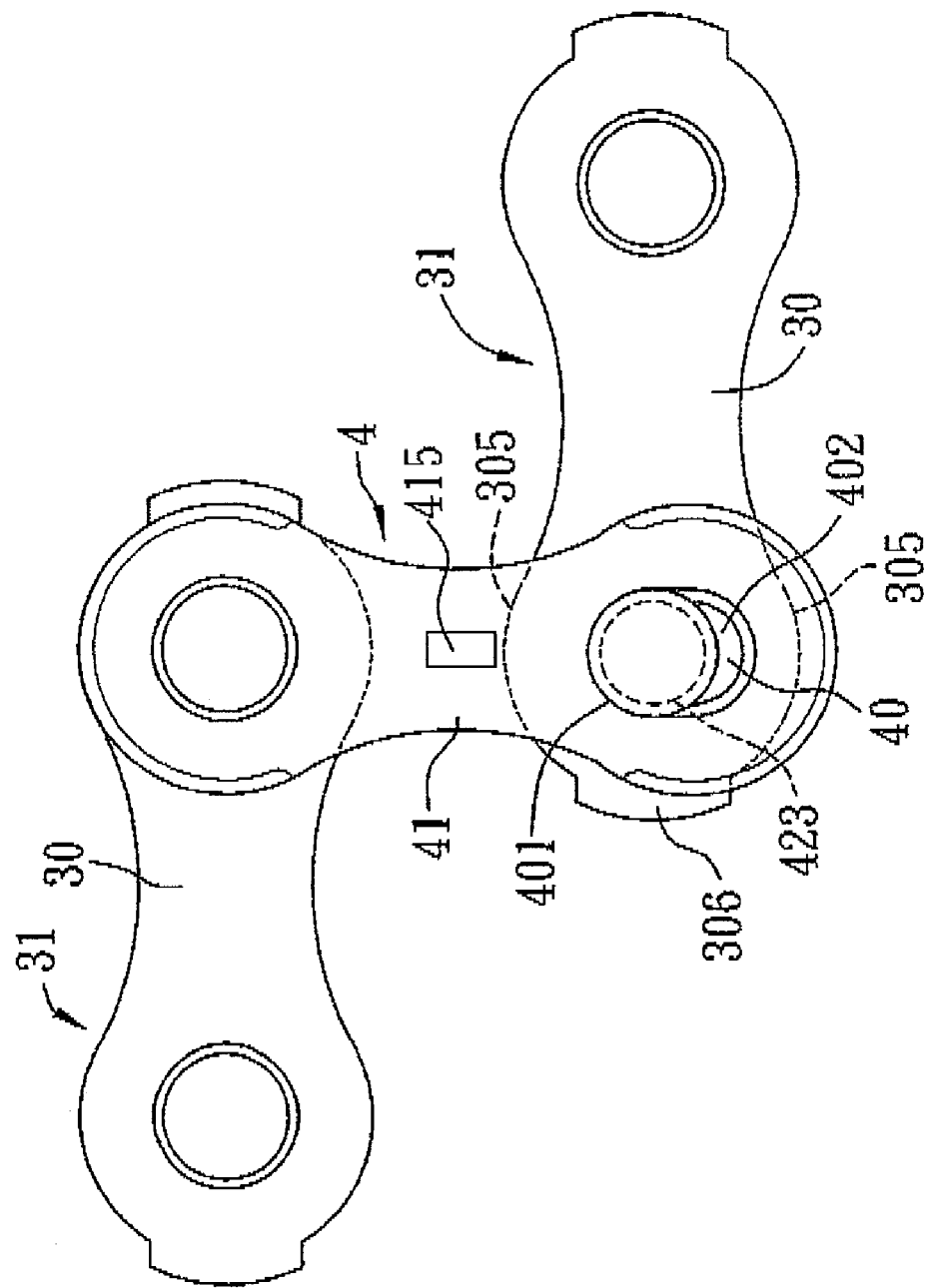
FIG. 7 is a fragmentary schematic side view of the first preferred embodiment when the connecting unit is at a first position.

As shown in FIGS. 4, 6 and 7, in this embodiment, during assembly of the chain of the invention, to assemble one link pin 42 and the first link plate 41 to the connecting unit 31, the connecting unit 31 is disposed at a first position, where it is perpendicular to the first link plate 41. The link pin 42 is then disposed between the first and second link plates 41, 41' with the mounting end portion 421 mounted fixedly in the pin mounting hole 413 in the second link plates 41' and the engaging end portion 422 extending through the through holes 303 in the first and second chain plates 30 and into the insert hole portion 401 of the retaining hole 40 of the first link plate 41. At this time, synchronous movement of the connecting unit 31 and the link pin 42 is allowed, and the stop block 415 of the first link plate 41 is registered with the second distal edge 3051 of one of the small diameter edge section 305 of the first chain plate 30. Afterward, an assembly of the connecting unit 31 and the link pin 42 is pushed in a direction away from the stop block 415 until the engaging end portion 422 is moved entirely from the insert hole portion 401 into and engages fittingly the retaining hole portion 402 with the retaining annular groove 423 engaging the flange 414. It should be noted that the connecting unit 31 may be disposed to form another angle with respect to the first link plate 41 other than a right angle as long as the stop block 415 is not registered with the first distal edge 3061 of the large diameter edge section 306 of the first chain plate 30.

Figure 8:
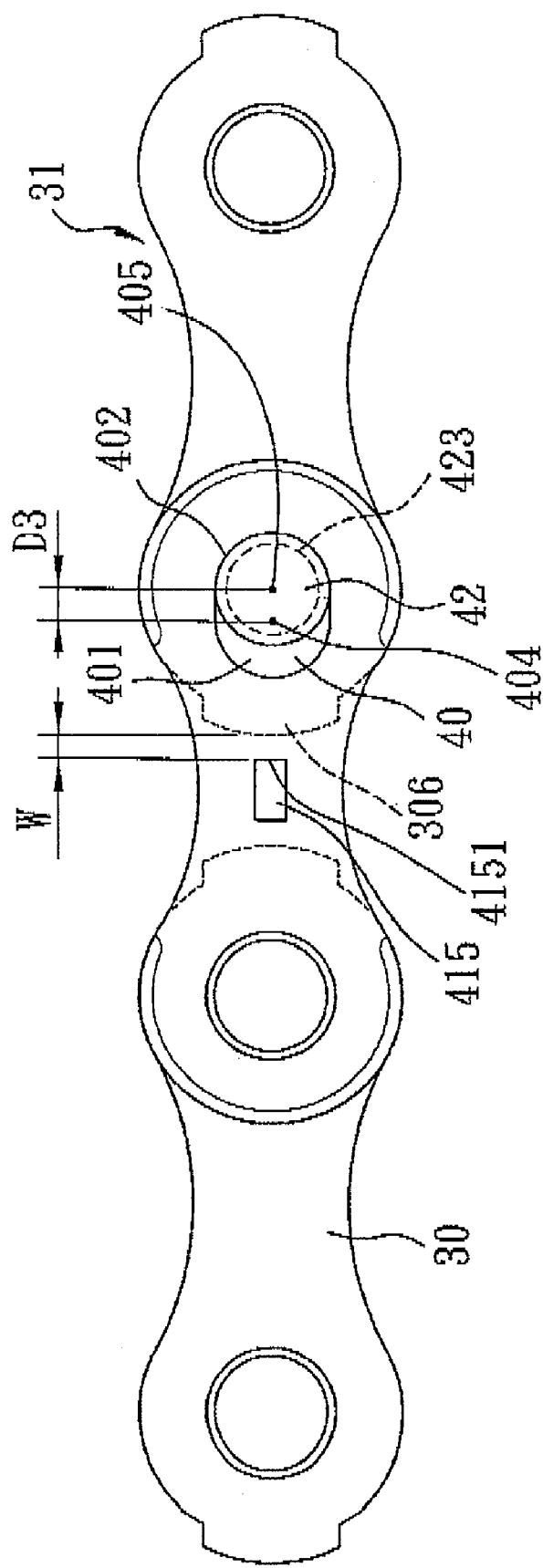
FIG. 8 is another fragmentary schematic side view of the first preferred embodiment when the connecting unit is at a second position.
Figure 9:
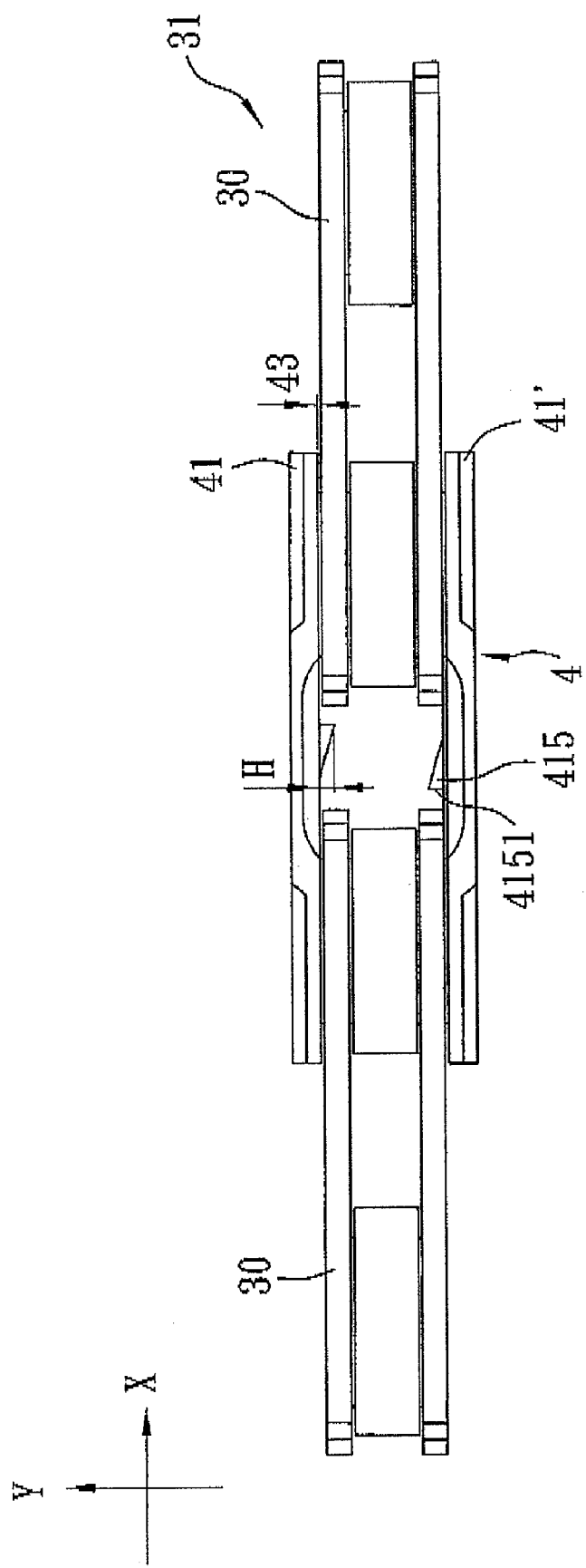
FIG. 9 is a fragmentary top view of the first preferred embodiment.

As shown in FIGS. 4, 8 and 9, in use, the connecting unit 31 is pivoted about the link pin 42 to a second position (see FIGS. 8 and 9), where the stop block 415 is registered with the first distal edge 3061 of the large diameter edge section 306 of the first chain plate 30. At this time, the first link plate 41 is spaced apart from the first chain plate 30 in the first transverse direction (Y) by a distance 43 that is shorter than the height (H) of the stop block 415 of the first link plate 41 in the first transverse direction (Y). Moreover, a third distance (W) between the stop surface 4151 of the stop block 415 and the first distal edge 3061 is shorter than a fourth distance (D3) between the central point 404 of the insert hole portion 401 and the central point 405 of the retaining hole portion 402 of the retaining hole 40 in the first link plate 41. Therefore, when the connecting unit 31 is pushed to move toward the stop block 415 along with the link pin 42, the engaging end portion 422 of the link pin 42 is not permitted to move entirely from the retaining hole portion 402 into the insert hole portion 401 due to contact of the first distal edge 3061 with the stop surface 4151, thereby avoiding removal of the link pin 42 from the link plate 41. Contrarily, the connecting unit 31 and the link unit 4 can be removed from each other by rotating the connecting unit 31 about the link pin 42 to the first position and pushing the connecting unit 31 to move the link pin 42 toward the stop block 415, such that the engaging end portion 422 of the link pin 42 is moved entirely from the retaining hole portion 402 into the insert hole portion 401 to thereby allow removal of the link pin 42 from the first link plate 41. Moreover, since each of the first and second link plates 41, 41' has an outline corresponding to that of each of the chain plates 30, as described above, the chain of the invention is applicable to a multi-speed bicycle to facilitate smooth speed-changing operation.

Figure 10:
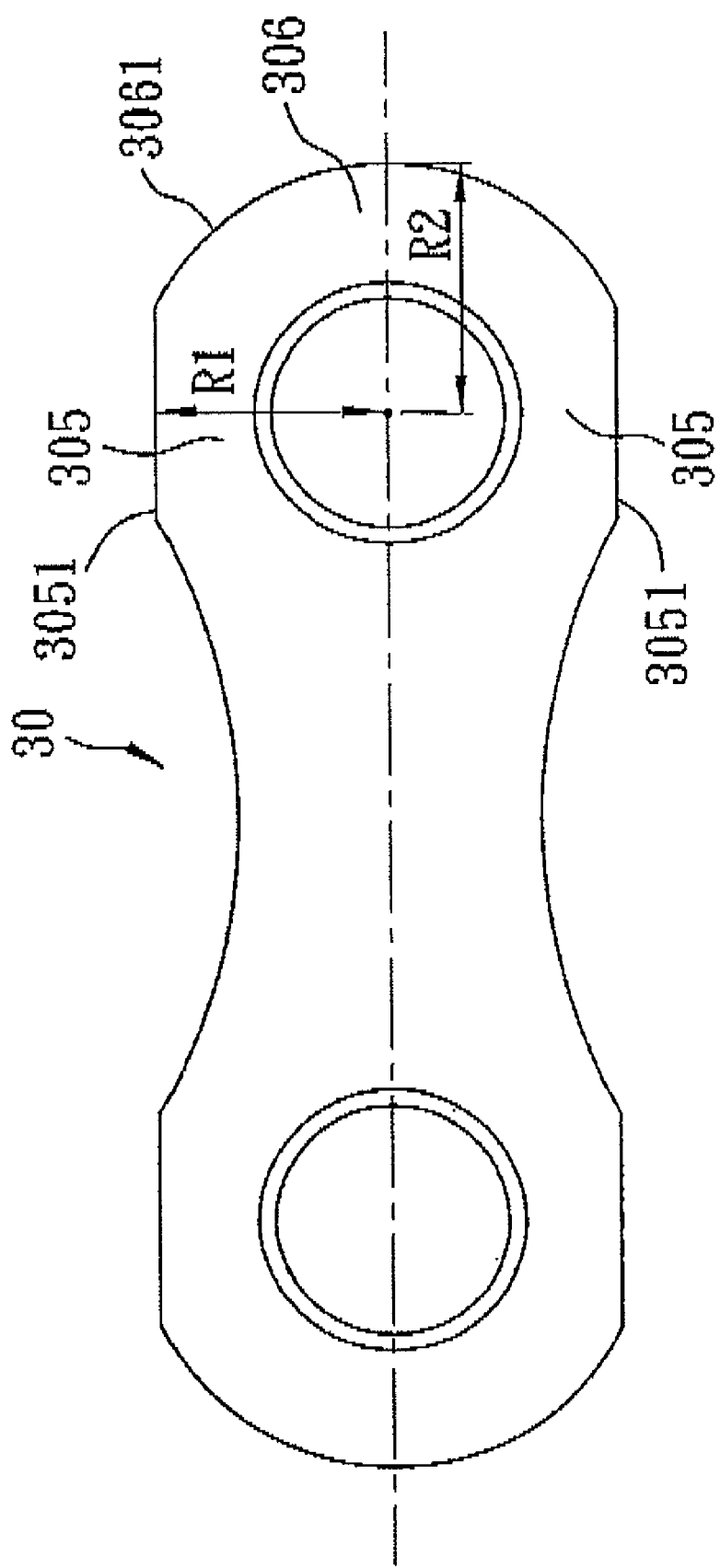
FIG. 10 is a side view of a first chain plate of a second preferred embodiment of the chain according to the invention.

As shown in FIG. 10, the second preferred embodiment of the chain according to the present invention has a structure similar to that of the first embodiment. The main difference between this embodiment and the previous embodiment resides in the configuration of the first and second chain plates 30. In this embodiment, the large diameter edge section 306 of the corresponding one of the first and second chain plates 30 is disposed at one of the end plate portions 301, and the first distal edge 3061 of the large diameter edge section 306 extends in a circumferential direction of the through hole 303 in the corresponding end plate portion 301. The second distal edge 3051 of the small diameter edge section 305 of the corresponding end plate portion 301 is configured as a flat surface. The second preferred embodiment has the same advantages as those of the first preferred embodiment.

Figure 11:
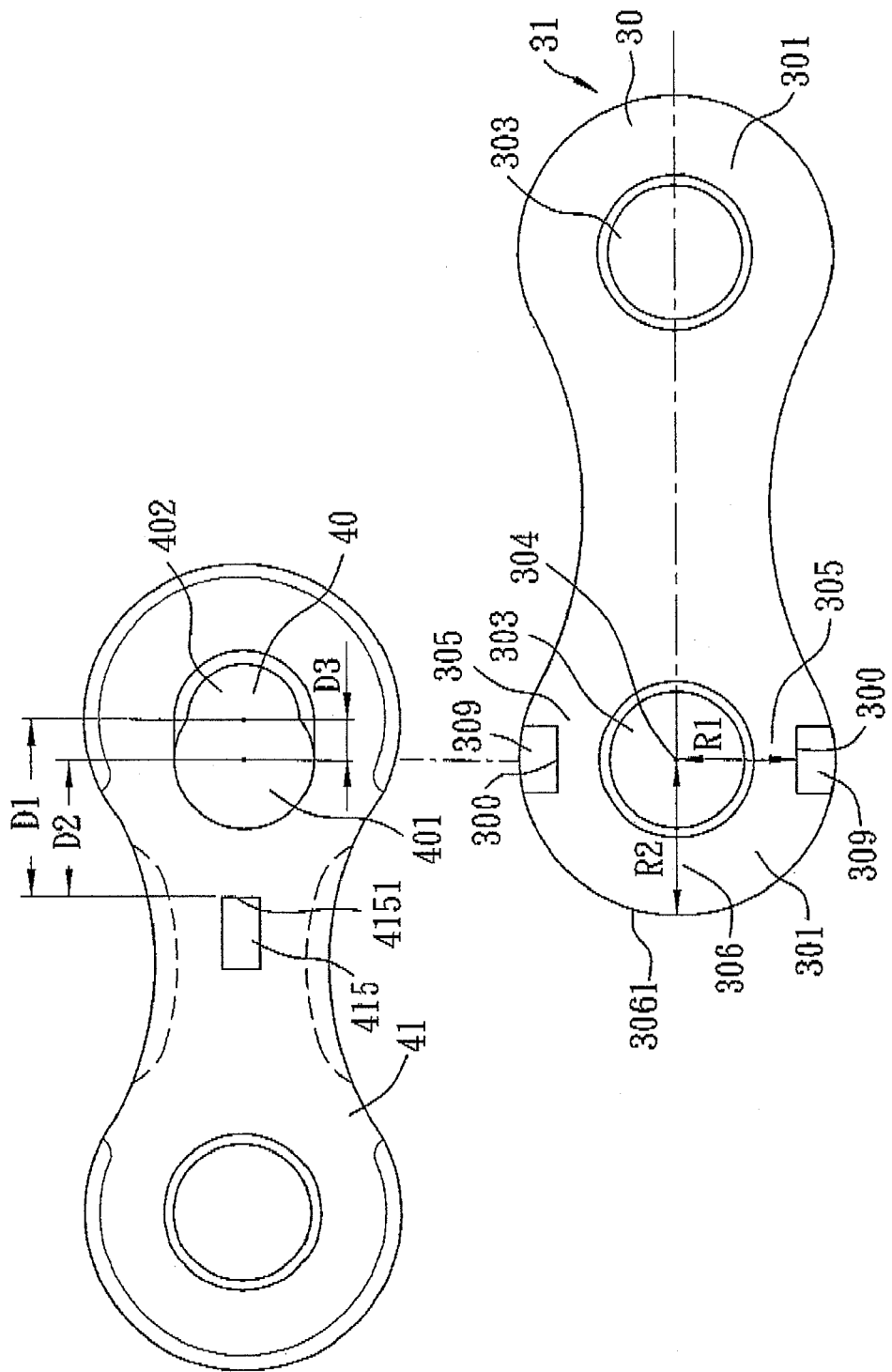
FIG. 11 is a side view of a first chain plate and a first link plate of a third preferred embodiment of the chain according to the invention.
Figure 12:
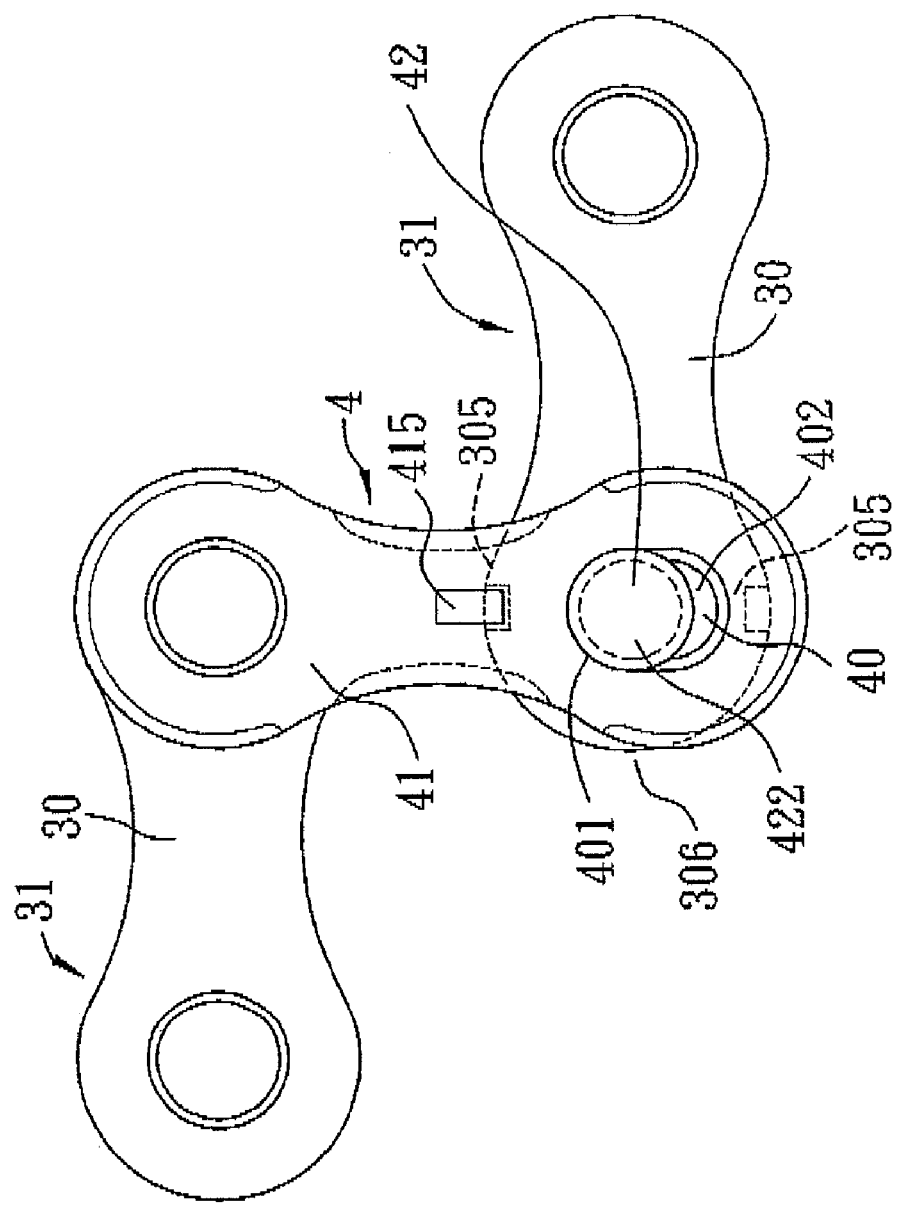
FIG. 12 is a fragmentary schematic side view of the third preferred embodiment when a connecting unit is at a first position.
Figure 13:
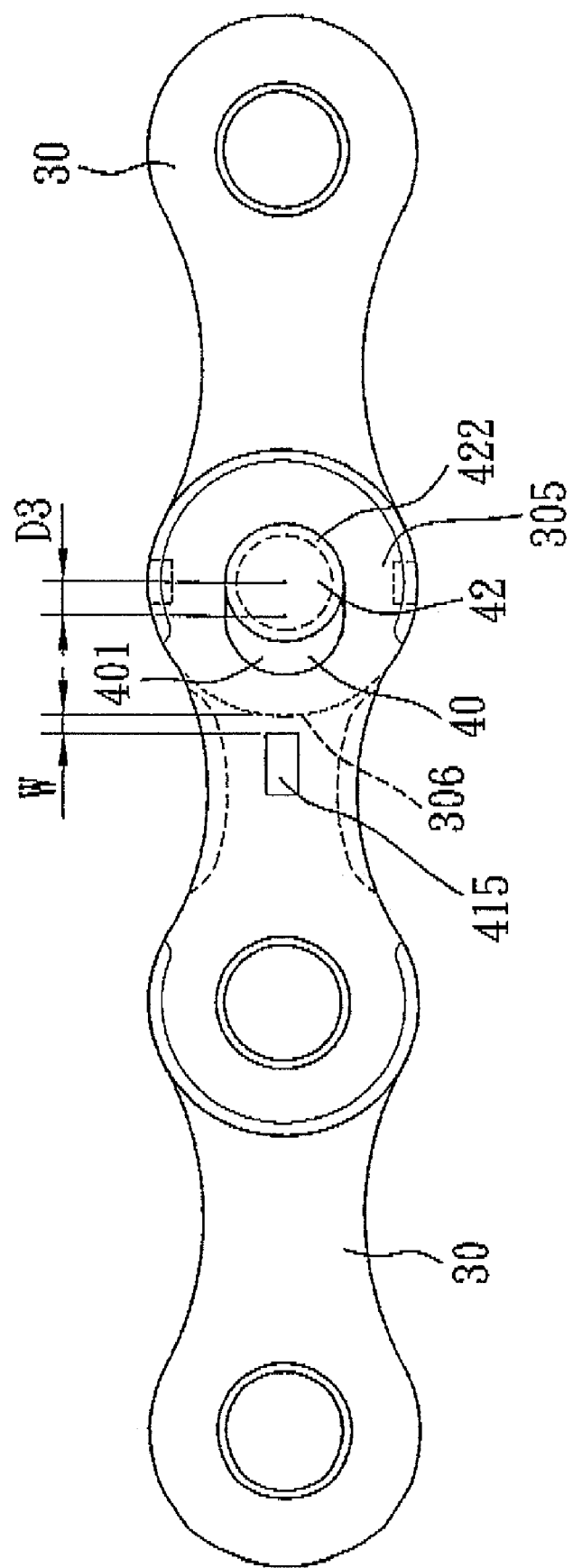
FIG. 13 is another fragmentary schematic side view of the third preferred embodiment when the connecting unit is at a second position.

As shown in FIGS. 11, 12 and 13, the third preferred embodiment of the chain according to the present invention has a structure similar to that of the second embodiment. The main difference between this embodiment and the previous embodiment resides in the configuration of the first and second chain plates 30. The end plate portion 301 formed with the large diameter edge section 306 is further formed with two recesses 309 flanking the through hole 303 and respectively adjacent to two circumferential ends of the first distal edge 3061 of the large diameter edge section 306, and walls 300 of a corresponding one of the first and second chain plates 30 disposed between the through hole 303 and the recesses 309 constitute the small diameter edge sections 305. When assembling the chain of this embodiment, the connecting unit 31 is disposed at a position where the stop block 415 of the corresponding one of the first and second link plates 41 extends into one of the recesses 309 to allow the engaging portion 422 of the link pin 42 to move entirely from the insert hole portion 401 of the retaining hole 40 into the retaining hole portion 402 of the retaining hole 40 in the corresponding one of the first and second link plates 41. The third preferred embodiment has the same advantages as those of the first and second preferred embodiments.

Figure 14:
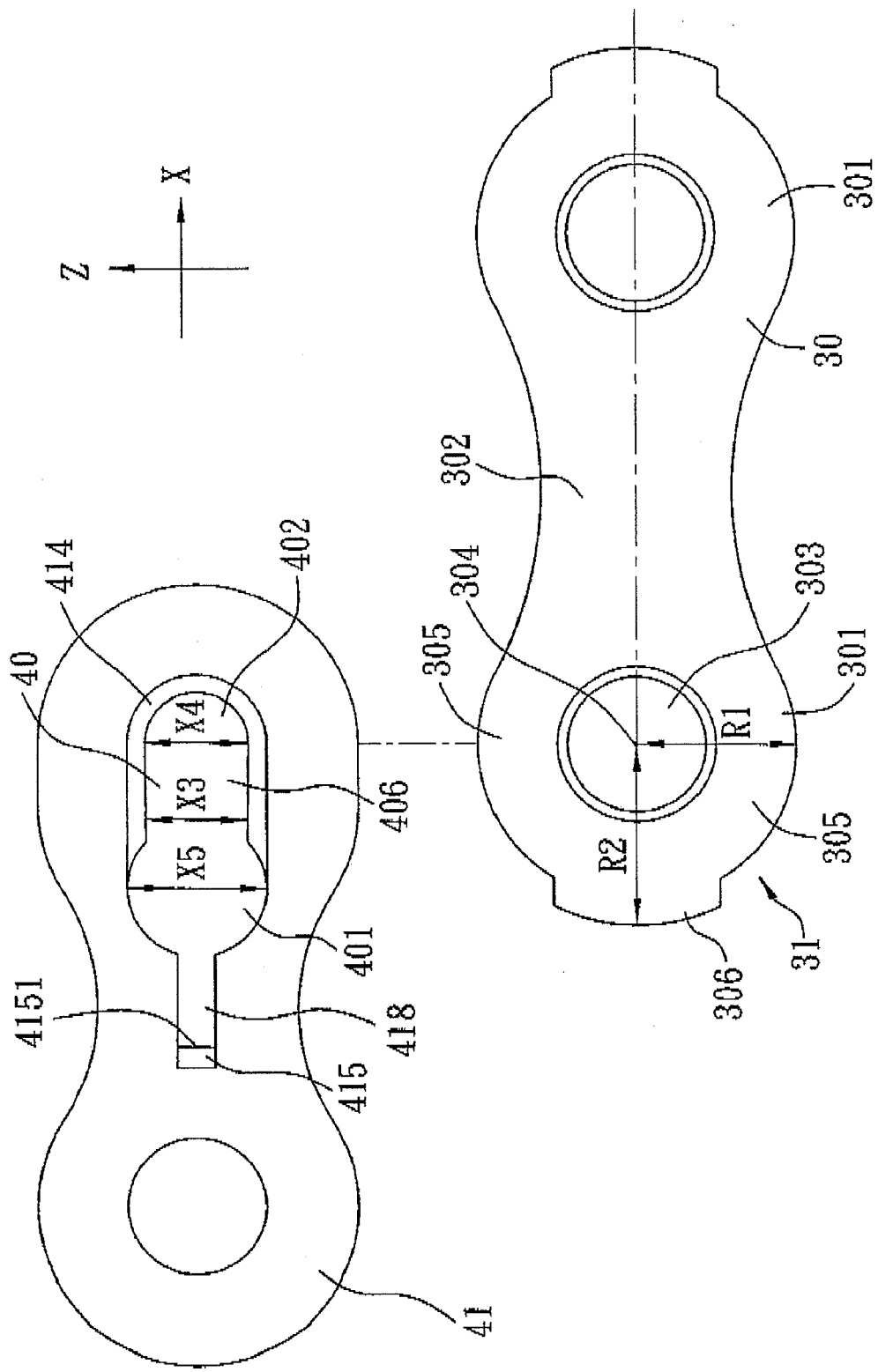
FIG. 14 is a side view of a first chain plate and a first link plate of a fourth preferred embodiment of the chain according to the invention.

As shown in FIG. 14, the fourth preferred embodiment of the chain according to the present invention has a structure similar to that of the first embodiment. The main difference between this embodiment and the first embodiment resides in the form of the retaining hole 40 in each of the first and second link plates 41. The retaining hole 40 in each of the first and second link plates 41 has the insert hole portion 401 with a third diameter (X5) in the second transverse direction (Z), the retaining hole portion 402 with a second diameter (X4) in the second transverse direction (Z), an extension hole portion 418 extending from the insert hole portion 401 toward the stop block 415 and ending at a position adjacent to the stop block 415, and a connecting hole portion 406 disposed between the insert hole portion 401 and the retaining hole portion 402. The connecting hole portion 406 has a first width (X3) in the second transverse direction (Z) that is equal to the second diameter (X4) and that is shorter than the third diameter (X5). The fourth preferred embodiment has the same advantages as those of the first preferred embodiment.

Figure 15:
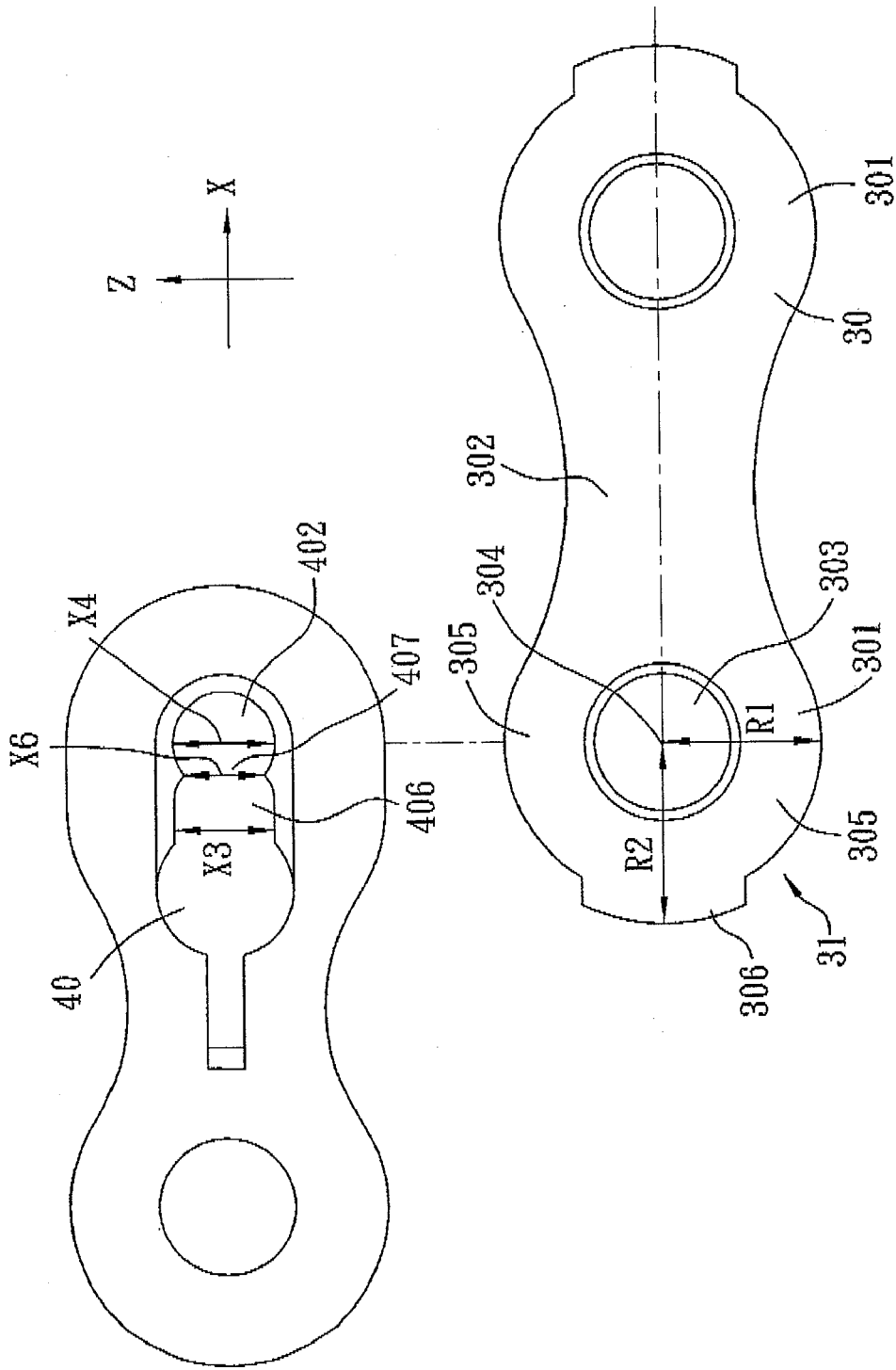
FIG. 15 is a side view of a first chain plate and a first link plate of a fifth preferred embodiment of the chain according to the invention.

As shown in FIG. 15, the fifth preferred embodiment of the chain according to the present invention has a structure similar to that of the fourth embodiment. The main difference between this embodiment and the fourth embodiment resides in the form of the retaining hole 40 in each of the first and second link plates 41. The retaining hole 40 of each of the link plates 41 further has a neck hole portion 407 disposed between the connecting hole portion 406 and the retaining hole portion 402, and having a second width (X6) in the second transverse direction (Z) that is shorter than the first width (X3) of the connecting hole portion 406 and the second diameter (X4) of the retaining hole portion 402. By virtue of the neck hole portion 407, the engaging end portion 422 of the link pin 42 can be retained more securely in the retaining hole portion 402 when assembling the chain of this embodiment. The fifth preferred embodiment has the same advantages as those of the first preferred embodiment.

Figure 16:
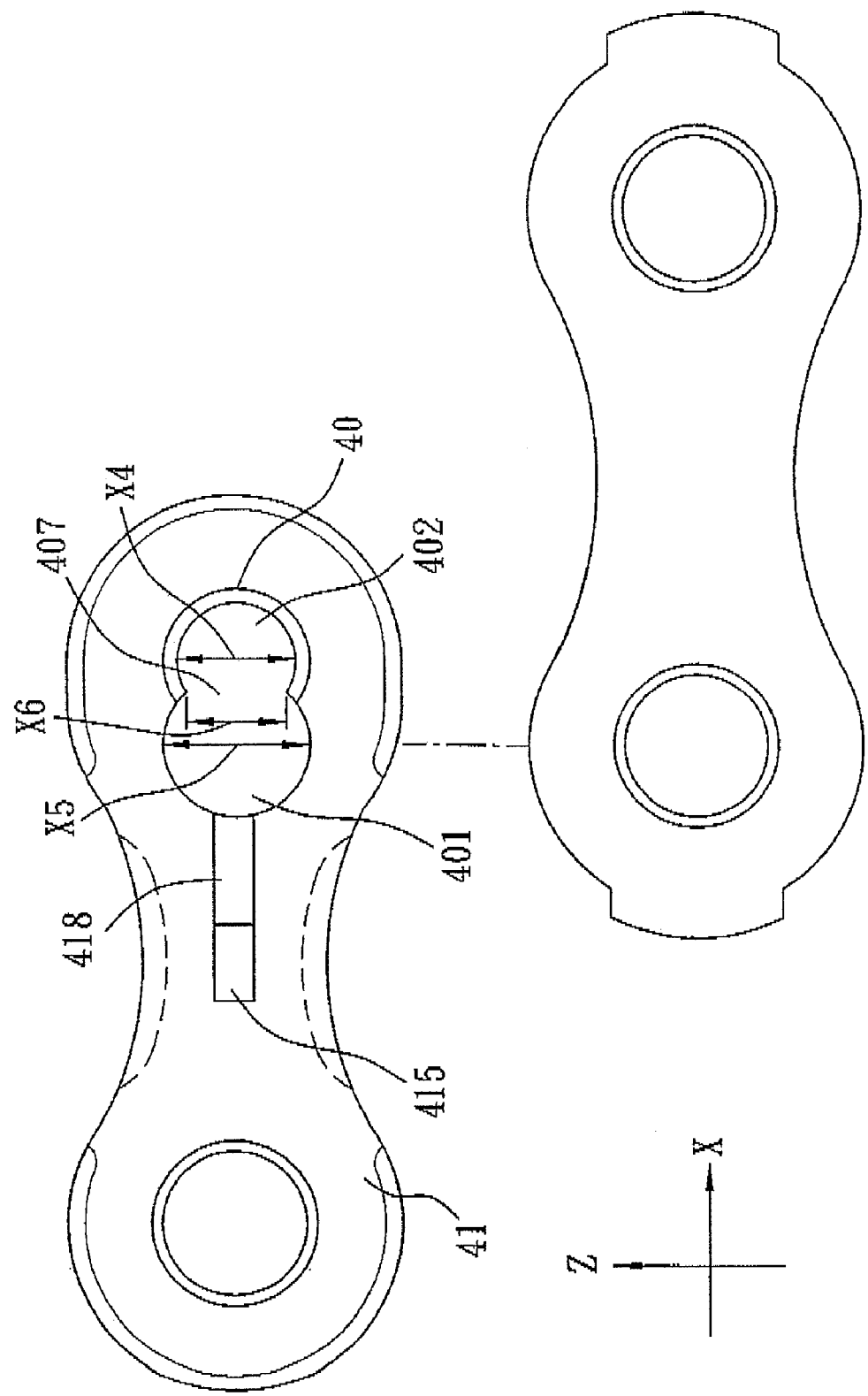
FIG. 16 is a side view of a first chain plate and a first link plate of a sixth preferred embodiment of the chain according to the invention.

As shown in FIG. 16, the sixth preferred embodiment of the chain according to the present invention has a structure similar to that of the first embodiment. The main difference between this embodiment and the first embodiment resides in the form of the retaining hole 40 in each of the first and second link plates 41. The retaining hole 40 in each of the first and second link plates 41 further has an extension hole portion 418 extending from the insert hole portion 401 toward the stop block 415 and ending at a position adjacent to the stop block 415, and a neck hole portion 407 disposed between the insert hole portion 401 and the retaining hole portion 402 and having a second width (X6) in the second transverse direction (Z) that is shorter than the second diameter (X4) of the retaining hole portion 402 and the third diameter (X5) of the insert hole portion 401. The sixth preferred embodiment has the same advantages as those of the first preferred embodiment.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A chain comprising:
a chain body including a connecting unit disposed at an end thereof, said connecting unit having a pair of first and second chain plates extending in a longitudinal direction and spaced apart from each other in a first transverse direction transverse to the longitudinal direction, each of said first and second chain plates having an end plate portion that is formed with a through hole therethrough, said through hole in one of said first and second chain plates being registered with that in the other one of said first and second chain plates in the first transverse direction, said end plate portion of said first chain plate being further formed with
a large diameter edge section that has a first distal edge, and
at least one small diameter edge section that has a second distal edge,
wherein said through hole in said first chain plate has a central point, a distance between said first distal edge and said central point of said through hole in said first chain plate being longer than that between said second distal edge and said central point of said through hole in said first chain plate; and
a link unit including
first and second link plates that are disposed parallel to said first and second chain plates and that are spaced from each other in the first transverse direction, each of said first and second link plates having a pair of opposite end plate parts and a waist plate part that interconnects said end plate parts, said first link plate being formed with a retaining hole at one of said end plate parts that has an insert hole portion proximate to said waist plate part of said first link plate and a retaining hole portion distal from said waist plate part of said first link plate and having a diameter shorter than that of said insert hole portion, said waist plate part of said first link plate being formed with a stop block that projects toward said second link plate, and
a link pin that is connected between said first and second link plates, that extends in the first transverse direction, and that has an engaging end portion extending through and engaging fittingly said through holes in said first and second chain plates and said retaining hole portion of said retaining hole in said first link plate so as to allow synchronous movement of said link pin and said first and second chain plates;
wherein said connecting unit is pivotable about said link pin between a first position, where said stop block is registered with said second distal edge so as to allow said link pin to move entirely from said retaining hole portion into said insert hole portion to thereby allow removal of said link pin from said first link plate, and a second position, where said stop block is registered with said first distal edge so as to prevent said link pin from moving entirely from said retaining hole portion into said insert hole portion due to contact of said first distal edge with said stop block; and
wherein said first distal edge of said large diameter edge section of said first chain plate extends in a circumferential direction of said through hole in said first chain plate, said first chain plate being further formed with two recesses flanking said through hole in said first chain plate and respectively adjacent to two circumferential ends of said first distal edge, walls of said first chain plate disposed between said through hole and said recesses constituting said small diameter edge sections.

2. The chain as claimed in claim 1, wherein:
said stop block has a stop surface facing said retaining hole; and
each of said insert hole portion and said retaining hole portion of said retaining hole has a central point a distance between said stop surface and said first distal edge is shorter than that between said central points of said insert hole portion and said retaining hole portion when said connecting unit is disposed at said second position.

3. The chain as claimed in claim 1, wherein said stop block of said first link plate of said link unit has a height in the first transverse direction, said first chain plate being spaced apart from said first link plate along said first transverse direction by a distance shorter than said height.

4. The chain as claimed in claim 1, wherein said stop block of said first link plate of said link unit is formed at a side surface of said first link plate facing said first chain plate, said first link plate further having two concaved surface portions that are formed on said side surface and that are disposed respectively at two opposite sides of said waist plate part in a second transverse direction perpendicular to the longitudinal direction and the first transverse direction.

5. The chain as claimed in claim 1, wherein said retaining hole portion of said retaining hole in said first link plate has a central point, said first link plate further having an inner surrounding wall that defines said retaining hole portion and a flange that extends radially and inwardly from said inner surrounding wall toward said central point of said retaining hole portion, said flange having two ends that are spaced apart from each other by a distance not shorter than a maximum diameter of said engaging end portion of said link pin of said link unit.

6. The chain as claimed in claim 1, wherein said second distal edge of said small diameter edge section of said first chain plate is configured as a flat surface.

7. The chain as claimed in claim 1, wherein said retaining hole in said first link plate further has a connecting hole portion disposed between said insert hole portion and said retaining hole portion, said connecting hole portion having a width in a second transverse direction that is perpendicular to the longitudinal direction and the first transverse direction, the width being shorter than the diameter of said insert hole portion.

8. The chain as claimed in claim 7, wherein said retaining hole in said first link plate further has an extension hole portion extending from said insert hole portion toward said stop block and ending at a position adjacent to said stop block.

9. The chain as claimed in claim 7, wherein said retaining hole in said first link plate further has a neck hole portion disposed between said connecting hole portion and said retaining hole portion, said neck hole portion having a width in the second transverse direction that is shorter than that of said connecting hole portion and the diameter of said retaining hole portion.

10. The chain as claimed in claim 1, wherein said retaining hole in said first link plate further has an extension hole portion extending from said insert hole portion toward said stop block and ending at a position adjacent to said stop block.

11. The chain as claimed in claim 1, wherein said retaining hole in said first link plate further has a neck hole portion disposed between said insert hole portion and said retaining hole portion, said neck hole portion having a width in the second transverse direction that is shorter than the diameters of said insert hole portion and said retaining hole portion.

\* \* \* \* \*